(12) United States Patent
Butler et al.

(10) Patent No.: US 10,311,449 B2
(45) Date of Patent: Jun. 4, 2019

(54) SYSTEMS AND METHODS FOR TARGETED ADVERTISING

(75) Inventors: W. J. Butler, Fairfield, CA (US); Gregory A. Pater, Fairfield, CA (US)

(73) Assignee: NEXTLEVEL ASSOCIATION SOLUTIONS, INC., Fairfield, CA (US)

(*) Notice: Subject to any disclaimer, the term of this patent is extended or adjusted under 35 U.S.C. 154(b) by 580 days.

(21) Appl. No.: 13/604,252

(22) Filed: Sep. 5, 2012

(65) Prior Publication Data

US 2014/0067497 A1    Mar. 6, 2014

(51) Int. Cl.
*G06Q 30/02* (2012.01)

(52) U.S. Cl.
CPC ......... *G06Q 30/02* (2013.01); *G06Q 30/0251* (2013.01); *G06Q 30/0269* (2013.01)

(58) Field of Classification Search
CPC ........................................ G06Q 30/0207–0277
USPC .................... 705/14.26, 47, 57, 14.5
See application file for complete search history.

(56) References Cited

U.S. PATENT DOCUMENTS

| | | | |
|---|---|---|---|
| 7,016,866 B1 | 3/2006 | Chin et al. | |
| 7,831,471 B2* | 11/2010 | Adams | G06Q 30/02 705/14.26 |
| 7,958,011 B1 | 6/2011 | Cretney et al. | |
| 2002/0161635 A1 | 10/2002 | Berg et al. | |
| 2004/0249705 A1 | 12/2004 | Spencer et al. | |
| 2005/0288957 A1* | 12/2005 | Eraker | G06Q 30/00 345/630 |
| 2008/0126170 A1* | 5/2008 | Leck | G06Q 10/10 705/313 |
| 2008/0262925 A1* | 10/2008 | Kim | G06Q 30/02 705/14.27 |
| 2009/0299839 A1 | 12/2009 | Uhl et al. | |
| 2009/0319380 A1 | 12/2009 | Jacoby et al. | |
| 2010/0198684 A1 | 8/2010 | Eraker et al. | |
| 2012/0030026 A1 | 2/2012 | Antonello et al. | |
| 2012/0066061 A1 | 3/2012 | Clement | |
| 2012/0277994 A1* | 11/2012 | Broome | 701/537 |

* cited by examiner

*Primary Examiner* — Chrystina E Zelaskiewicz
(74) *Attorney, Agent, or Firm* — Squire Patton Boggs (US) LLP

(57) ABSTRACT

Systems and methods for targeted advertising are described. The systems and methods identify a series of events that may be related to a transaction for goods and services. The systems and methods may select at least one future event from the series of events. The systems and methods may generate an account with information about goods and services, and parties to the transaction. The systems and methods may use the information contained in the account about the goods and services and at least one future event as a selection criteria and trigger for sending targeted advertisements to a customer.

22 Claims, 10 Drawing Sheets

SYSTEMS AND METHODS FOR TARGETED ADVERTISING

FIELD OF THE INVENTION

The present invention relates to systems and methods for targeted advertising and, more specifically, to systems and methods for improving accuracy and tracking of advertising.

BACKGROUND OF THE INVENTION

Existing systems for targeted advertising may be used to provide advertisements based on various pieces of individual information.

In specific applications, there are certain times when advertisers would like to direct advertisements to particular customers. For example, it is known that an individual purchasing real property is likely to spend significantly more money on household goods and services around the time of the purchase than other individuals of similar demographics in similar locations. As such, it would be advantageous to direct advertisements for services related to moving or new home purchases to real estate purchasers at the time of purchase. Existing systems can provide advertisements around the time of purchase, but are typically provided after a real estate transaction is complete. The purchasing individual, however, often has needs for specialized goods and services prior to events, such as at closing of a real property transaction. Furthermore, it is not always possible to determine based on publicly available information when an individual is either selling or buying real estate before the closing of a real property transaction. Systems and methods that do exist do not provide advertisements specific to users based on various characteristics of the user and property. Similar issues arise for applications outside the field of real estate.

Needs exist for improved systems and methods for targeted advertising that provide timely and narrowly tailored advertisements.

SUMMARY OF THE INVENTION

Embodiments of the present invention solve many of the problems and/or overcome many of the drawbacks and disadvantages of the prior art by providing systems and methods for targeted advertising.

Embodiments of the present invention may include systems and methods for targeted advertising. The systems and methods may include receiving information regarding a future event. The information may include a time and/or a user identification. Receiving local additional information regarding the user from the one or more databases; requesting third party additional information regarding the user from one or more third party databases; accessing advertiser information from the one or more databases; selecting one or more advertisements based on the advertiser information, information regarding the future event, the local additional information, and the third party additional information; creating a communication template for the one or more selected advertisers; and sending the communication template. The event may be tracked to its completion.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Figure 1:
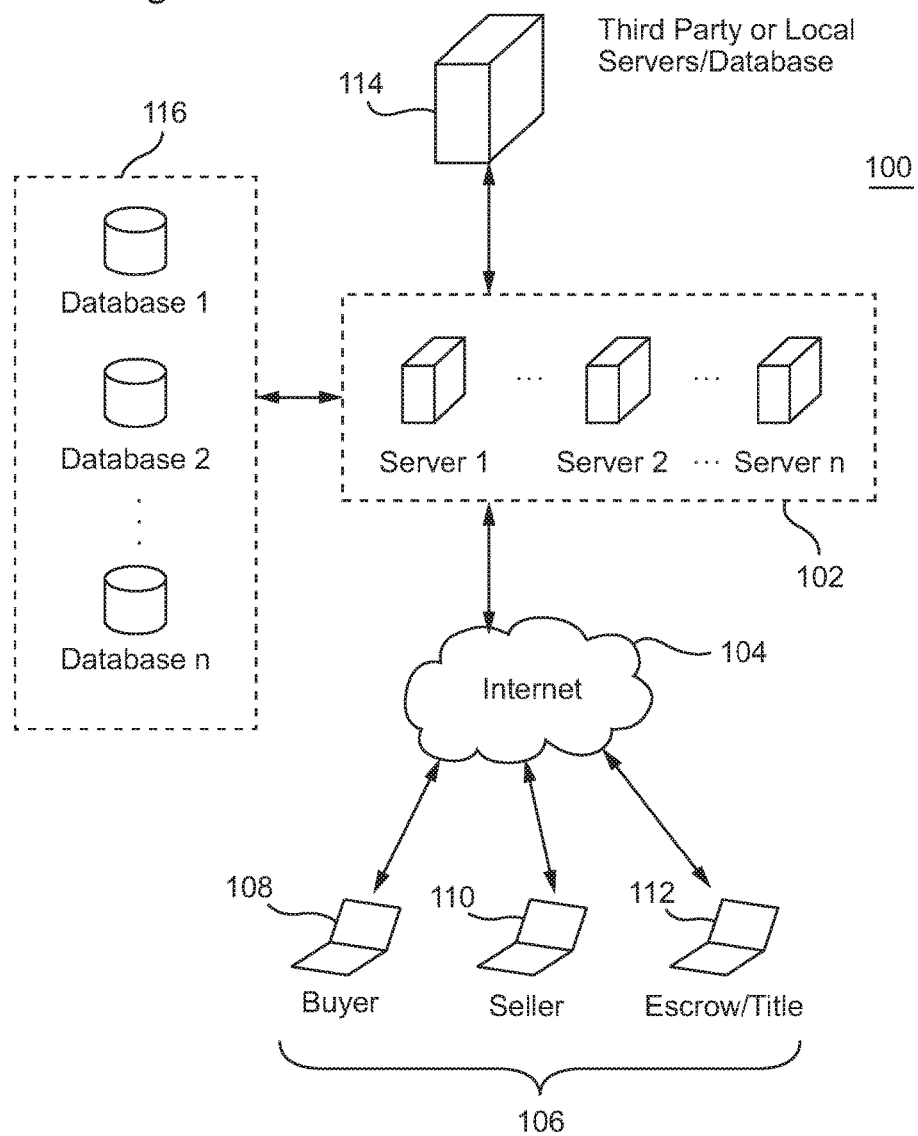
FIG. 1 shows an exemplary system for targeted adverting in a networked computing environment.

Systems and methods are described for targeted advertising. The examples described herein relate to real estate transactions for illustrative purposes only. The systems and methods described herein may be used for many different industries and purposes. In particular, the systems and methods may be used for any industry or purpose where there are events that appeal to advertisers. Or the systems and methods may be used for any industry or purpose in which a series of one or more events may require a response from an entity or database to render a decision or complete a process or transaction. While use with real estate transactions is described to show operation of the systems and methods, it is understood that other applications are possible.

Other use of the systems and methods may include for example, an apartment rental transaction. In an apartment rental transaction, the rental application process may subject one or more prospective renters to a screening process, which may require several checks, such as a credit check, background investigation, employment verification or other appropriate check. During these checks, critical data such as the prospective renter's address, phone number, email address, social security number, driver's license number, state identification card number or employment data may be collected and submitted for processing to a third party. The third party may provide results, which include data elements, such as criminal records, lien or judgments, previous employment, driving record, or other data elements about a prospective renter. These results from the third party can be stored in a database. Many advertising opportunities may exist for vendors offering services for the apartment or prospective renter such as, moving companies, credit card companies, daycare services, cleaning or house keeping services, home improvement services or other services during the rental application process. When a prospective renter is selected, the systems and methods may send out a series of different advertisements to the prospective renter from one or more appropriate vendors. If the prospective renter's rental application is rejected, the systems and methods may send out targeted advertisements to the renter from vendors, such as credit restoration services, secured credit cards or other services and/or resources that could improve some of the items that may have negatively impacted the prospective renter in the application process. A positive response during a rental application process for a prospective renter may trigger more advertisements from vendors that offer services related to the real property as well as to the prospective tenant.

In another example, the systems and methods may be used for the sale of firearms or other restricted items. For the sale of firearms or other restricted items, several states require a waiting period during which a background check may be performed on the buyer of the firearms or restricted items. During a sales process for firearms or other restricted items, after the purchaser selects a type of firearm or restricted item, data such as, age, contact information, social security number, driver's license number, state identification card number, may be collected by the seller from the purchaser and submitted to a third party. During the waiting period the systems and methods may use the data provided by the purchaser to send specific or targeted marketing to the firearms or restricted items purchaser, such as ammunition, guns, hunting lodges, etc. When the seller receives a response from the third party, such as a decision, the systems and methods may use the data provided by the purchaser and/or the response from the third party to provide the purchase of the firearm or restricted item with specific or targeted advertisements. A positive response during the waiting period for the purchase of a firearm or restricted item may garner one type of email campaign from vendors and a negative response would target a different type of advertisement campaign from vendors.

In a further example, the systems and methods may be used during credit card application process. During the credit card application process, the applicant may submit data, such as, age, contact information, social security number, driver's license number, state identification card number to a credit card processing bureau. This credit card bureau may submit this data to one or more third parties for processing before making an underwriting decision. During the application process, advertising campaigns to the applicant may be initiated based on data submitted during the credit card application process, such as age, homeownership, renter, income, employment. The email campaign may be run again after the credit decision has been made. A positive credit decision would trigger a different campaign than would a declination decision.

Although not required, the systems and methods are described in the general context of computer program instructions executed by one or more computing devices. Computing devices typically include one or more processors coupled to data storage for computer program modules and data. Key technologies include, but are not limited to, the multi-industry standards of Microsoft Operating Systems, SQL Server, .NET Framework (VB.NET, ASP.NET, AJAX-.NET, etc.), Oracle database BIEE products, other e-Commerce products and computer languages. Such program modules generally include computer program instructions such as routines, programs, objects, components, etc., for execution by the at least one processor to perform particular tasks, utilize data, data structures, and/or implement particular abstract data types. While the systems, methods, and apparatus are described in the foregoing context, acts and operations described hereinafter may also be implemented in hardware as well as through utilization of the internet.

FIG. 1 shows an exemplary system 100 for targeted advertising campaigns according to one embodiment. In this exemplary implementation, system 100 may include one or more servers/computing devices 102 (e.g., server 1, server 2, . . . , server n) operatively coupled over network 104 to one or more client computing devices 106, such as one or more buyer computing devices 108, one or more seller computing devices 110, one or more escrow/title computing devices 112, etc. The one or more servers/computing devices 102 may also be operatively connected, such as over a network, to one or more third party servers/databases 114. The one or more servers/computing devices 102 may also be operatively connected, such as over a network, to one or more system databases 116 (e.g., database 1, database 2, . . . , database n).

Server/computing device 102 may represent, for example, any one or more of a server, a general-purpose computing device such as a server, a personal computer (PC), a laptop, and/or so on. Networks 104 represent, for example, any combination of the Internet, local area network(s) such as an intranet, wide area network(s), and/or so on. Such networking environments are commonplace in offices, enterprise-wide computer networks, etc. Client computing devices 106, which may include at least one processor, represent a set of arbitrary computing devices executing application(s) that respectively send data inputs to server/computing device 102 and/or receive data outputs from server/computing device 102. Such computing devices include, for example, one or more of desktop computers, laptops, mobile computing devices (e.g., tablets, smart phones, PDAs), server computers, and/or so on. In this implementation, the input data comprises, for example, requests, customer information, data files, dates, and/or so on, for processing with server/computing device 102. In one implementation, the data outputs include, for example, emails, templates, advertisements, and/or so on. Embodiments of the present invention may also be used for collaborative projects with multiple users logging in and performing various operations on a data project from various locations. Embodiments of the present invention may be web-based, smart phone-based and/or tablet-based.

In this exemplary implementation, server/computing device 102 includes at least one processor coupled to a system memory. System memory may include computer program modules and program data.

In embodiments of the present invention, one or more users may interact with the system. The system may include a processor and/or memory to operate the system and memory described herein. The one or more users may be divided into categories that include, but are not limited to, homeowners/sellers, buyers, professional users (title agents, escrow agents, realtors, attorneys, etc.), management companies (MCs), advertisers, system administrators, etc.

In embodiments of the present invention, one or more users may sign up to use the system. Sign up may be via website, telephone registration, paper forms, etc. Preferably, the sign up information provided by the user includes contact information, such as, but not limited to, email address, mailing address, phone numbers, and other identifying information. Based upon the sign up information, the users may be assigned to categories of users and may be granted corresponding privileges within the system. For example, the privileges may be distinct between a management company user and a homeowner user. The category of user may also determine what information is available on the system website.

Figure 2:
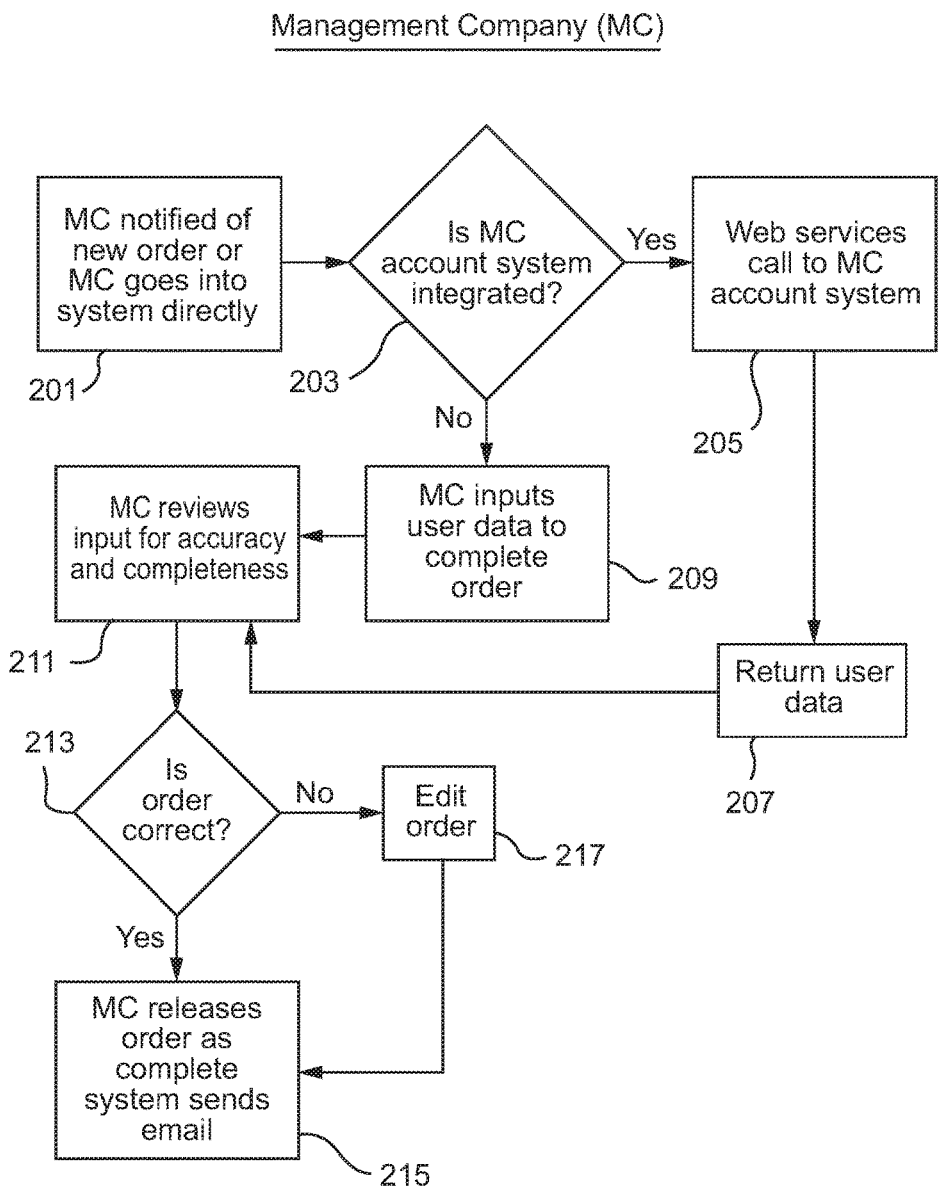
FIG. 2 shows an exemplary process for a management company process.
Figure 3:
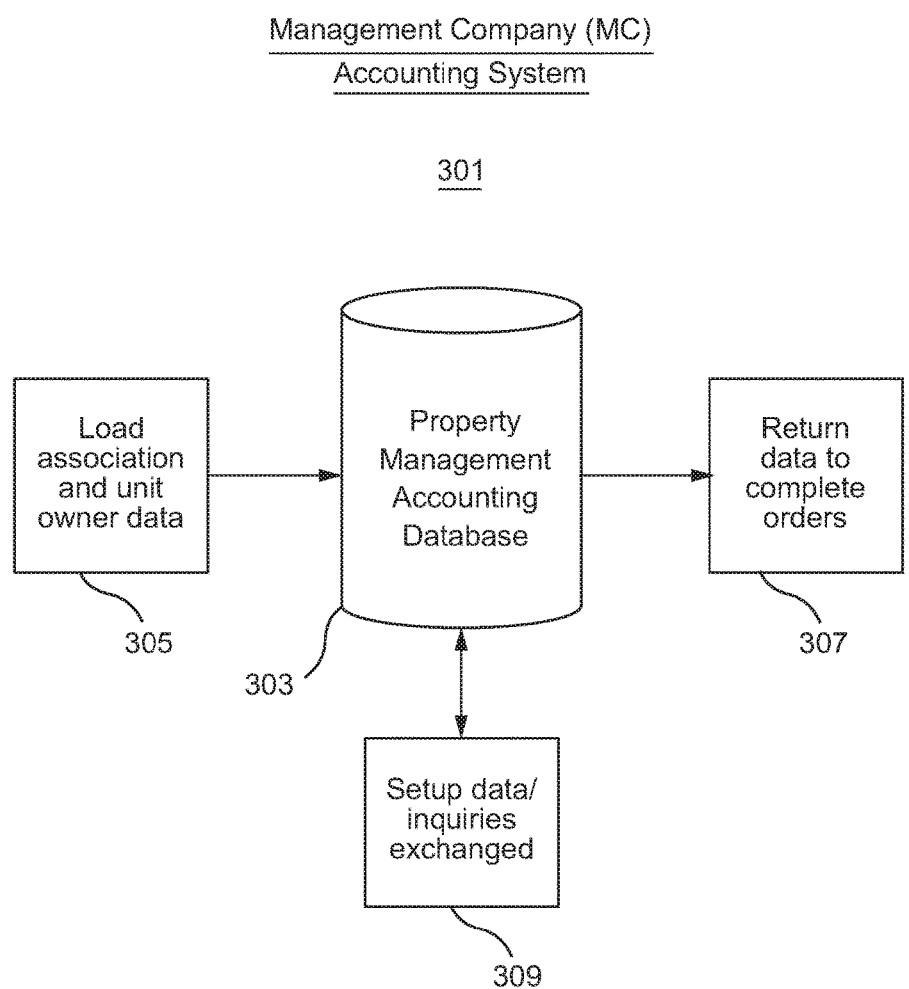
FIG. 3 shows an exemplary management company accounting system for use with the system of the present invention.

A primary user of the system may be a management company (MC). FIG. 2 shows an exemplary process for a management company process. FIG. 3 shows an exemplary management company accounting system for use with the system of the present invention.

A management company, such as a homeowner's association (HOA), may initially set up an account with the system. The management company may agree to use the system to process critical data, such as association data and/or homeowner data, and documents needed in real estate transaction and homeowner inquiries. Real estate transactions may include, but are not limited to, selling, refinancing, inquiries about documents, engaging real estate agents, listing homes in Multiple Listing Service (MLS), showing homes, identifying buyers, signing contracts, opening escrow, ordering disclosure package by one of the parties, etc. After approval, the management company may be granted access to the system and an account may be established. The account may include information about the properties managed by the management company, documents relevant to the management company, etc. The documents may include, but are not limited to, HOA governing documents, HOA critical data, state compliance forms, forms and products provided by the system, etc. The forms and products provided by the system may include, for example, 1368 forms for California, property inspection forms, etc. Data may include association information, management company information, property address, name of closing agent, company and contact information, name of realtor, company and contact information, seller name, subject property and contact information, buyer name, current residence and contact information, estimated closing date, etc. The data may be manually loaded or automatically loaded through the management company accounting system, as shown in FIG. 3. The management company's account may then be activated making the documents and data available via the system to the management company, registered users, the general public, etc.

Orders for data and documents can be placed by homeowners or other users, such as title/escrow agents, realtors, attorneys, etc., representing one or more parties involved in the real estate transaction. During the order process, the system may collect buyer and seller contact information such as, but not limited to, email address, mailing address, phone numbers, and other identifying information. The system may also collect information pertaining to the transaction, such as, but not limited to, estimated closing date, sales price, etc.

As shown in FIG. 2, once a management company account is activated, the management company may be notified of any new orders to the system, or the management company may directly access the system to see new orders 201. A determination may be made as to whether the management company account system is integrated 203. If yes, a web services call may be made to the management account system 205. User data may be returned 207 from the management company accounting system. If the management company accounting system is not integrated, the management company may input user data to complete the new order 209. The management company may then review the input for accuracy and completeness 211. A check may be made to determine if the order is correct 213. If yes, the management company may release the order as complete and the system may send an email or other communication 215. If no, the order may be edited 217 before releasing the order as complete and sending an email or other communication. It should be noted that while email communications are described herein, the communications can include any type, such as voice, SMS, MMS, mail, etc.

After the completion of final step in the ordering process, users may be informed via the communication that they have earned access to pre-negotiated discounts by placing orders through the system. The users may be provided with a code and link to the system's advertising portal.

FIG. 3 shows an exemplary system for a management company accounting system 301. A property management accounting database 303 may receive association and unit owner data 305. The database 303 may return data to complete orders 307. The database 303 may communicate with the system to set up data and exchange inquiries 309.

Other users of the system may also set up accounts.

Figure 4:
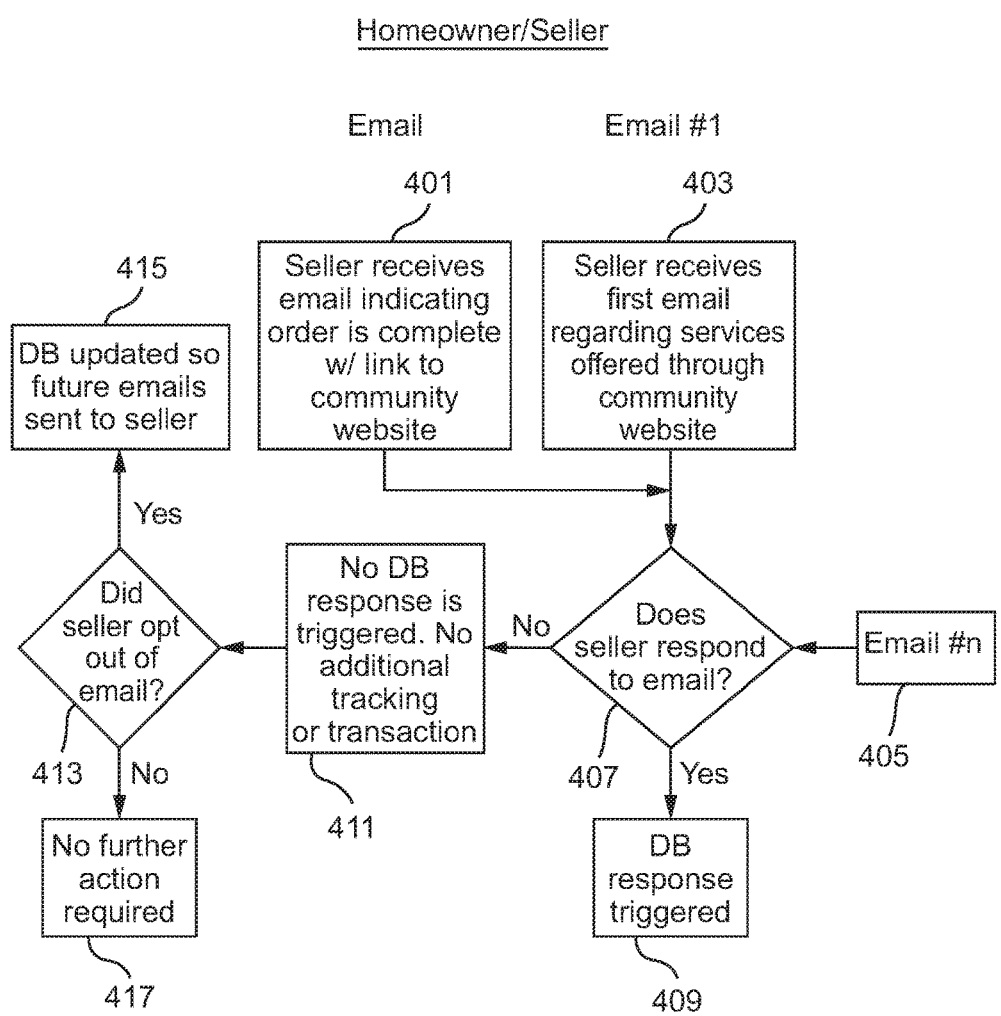
FIG. 4 shows an exemplary process for a homeowner/seller.

FIG. 4 shows an exemplary process for a homeowner/seller. After completion of the order process, as described above, the homeowner/seller may receive an initial communication, such as, for example, an email. The initial email 401 may indicate that the order is complete and may include a link to a portal for the community website. The homeowner/seller may receive subsequent emails, email #1 403, ..., email #n 405, with links to the portal for the community website. A determination of the homeowner/seller response may be determined 407. If the homeowner/seller responds, a database response may be triggered 409. The database response may include tracking of any subsequent transactions. If there is no response, no further database response may be triggered, and no additional tracking or transactions may occur 411. A determination may be made whether the homeowner/seller opted out of email communications 413. If yes, the database is updated so future emails are not sent to the homeowner/seller 415. If no, no further action may be required 417.

Figure 5:
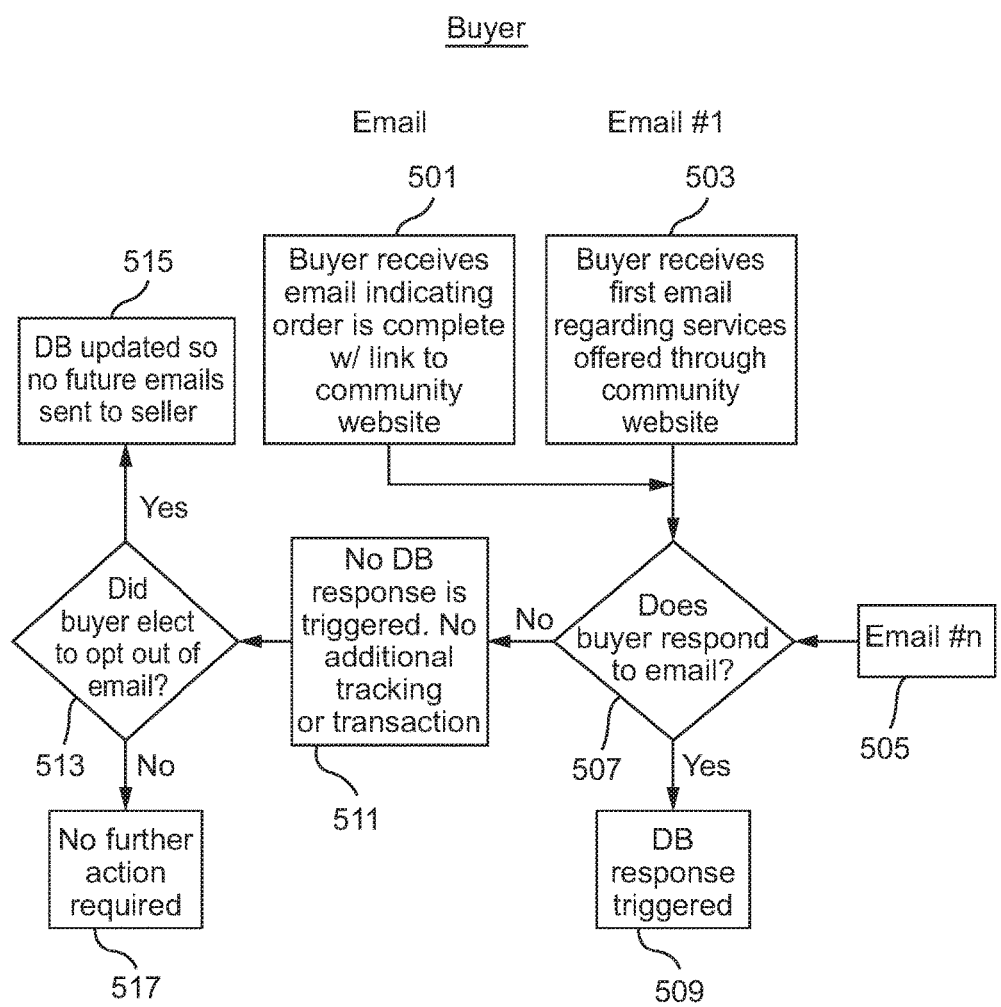
FIG. 5 shows an exemplary process for a buyer.

FIG. 5 shows an exemplary process for a buyer. After completion of the order process, as described above, the buyer may receive an initial communication, such as, for example, an email. The initial email 501 may indicate that the order is complete and may include a link to a portal for the community website. The buyer may receive subsequent emails, email #1 503, ..., email #n 505, with links to the portal for the community website. A determination of the buyer response may be determined 507. If the buyer responds, a database response may be triggered 509. The database response may include tracking of any subsequent transactions. If there is no response, no further database response may be triggered, and no additional tracking or transactions may occur 511. A determination may be made whether the buyer opted out of email communications 513. If yes, the database is updated so future emails are not sent to the buyer 515. If no, no further action may be required 517.

Figure 6:
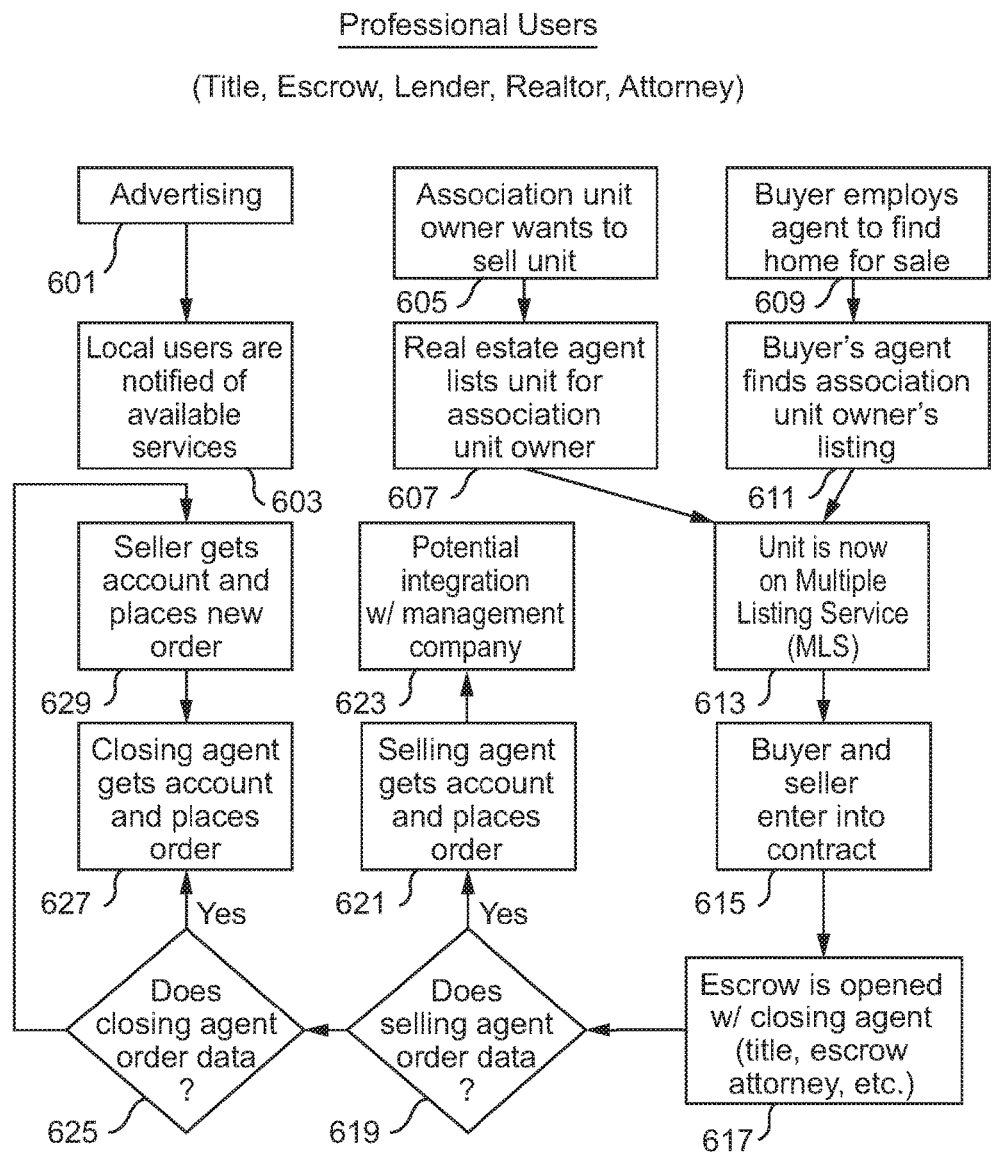
FIG. 6 shows an exemplary process for a professional user.

FIG. 6 shows an exemplary process for a professional user, such as title/escrow agent, lender, realtor, attorney, etc. Initially, advertising from the system may lead to local or national professional users to sign up with the system. In the advertising 601, professional users may be notified of services offered by the system 603. In an exemplary embodiment, a homeowner association unit owner may want to sell a unit 605. A real estate agent may list the unit for the homeowner 607. A buyer may employ a real estate agent to find a home for sale 609. The buyer's real estate agent may find the homeowner's listing 611. The unit may be listed with the Multiple Listing Service (MLS) 613. The buyer and the seller may enter into a contract for purchase of the unit 615. Escrow may be opened with a closing agent, such as a title agent, escrow attorney, etc. 617. A determination may be made as to whether the selling real estate agent will order data 619. If yes, the selling agent gets an account, or signs into an existing account, and places an order 621. Potential integration with the management company may be utilized 623. Integration may provide for updating of the database with new buyer and homeowner/seller information from the user. If no, a determination may be made as to whether the closing agent will order data 625. If yes, the closing agent gets an account, or signs into an existing account, and places an order 627. If no, the seller may get an account, or sign into an existing account, and place a new order 629.

Advertisers may also sign up with the system. Advertisers may contact the system and/or may be solicited. Specific advertisements may be placed in front of homeowners/ sellers and prospective property owners with the management community's associations and accounts. Advertisers may include, but are not limited to: homeowner insurance carriers, home furnishings providers, landscapers, painters, roofers, appliance dealers, movers, etc.

Figure 7:
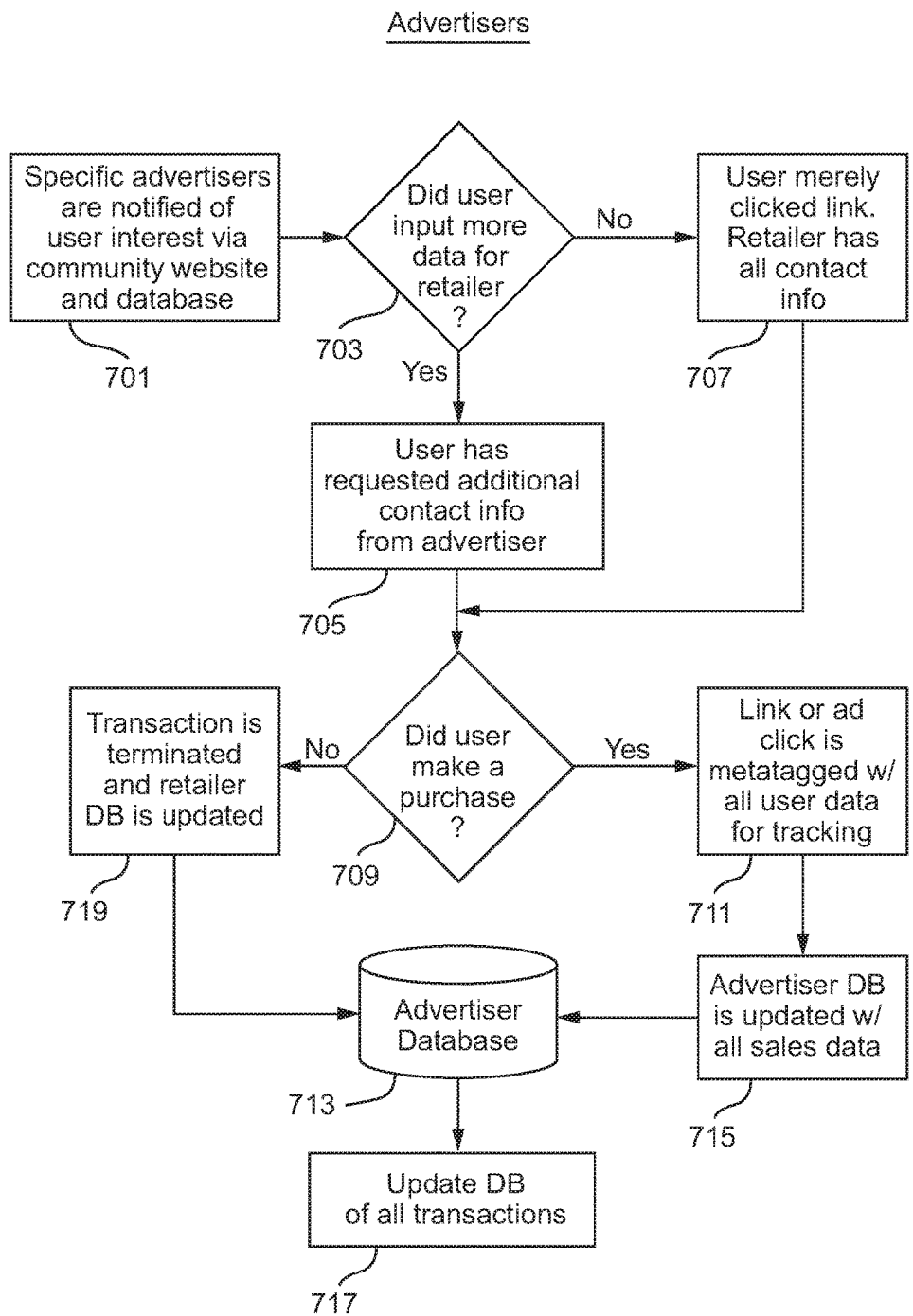
FIG. 7 shows an exemplary process for advertisers.

FIG. 7 shows an exemplary process for advertisers. Specific advertisers may be notified of user interest via the community portal or website 701. A determination may be made whether the user may be required to input more data for the retailer/advertiser 703. If yes, the user may have requested additional information from the advertiser 705. If no, the user may have merely clicked a link 707. The retailer may have all contact information. A determination may be made as to whether the user made a purchase 709. If yes, the link or advertisement that was clicked may be metatagged with all user data for tracking 711. In some alternatives, user data may be metatagged using any conventional means known in the art. The metatagged user data may include buyer name, sellers name, existing homeowner or system user's name ("Users"), Users email address, Users contact information, community manager's name, community manager's contact information, name of the real property's home owners association, estimated closing date, purchase price, or other information about the real property from third parties, such as real property square footage, real property lot size, availability of a pool on the property, number of bedrooms, number of bathrooms, pictures, sales history, value estimate, rental estimate, tax history, or other real property data.

If a user is redirected to the website portal via an email, all of the user data indicated above may be transferred to the website portal and tracked by one or more of the systems database. Tracking data may include portions of the website portal accessed by the user and links a user click on the website portal. This data may be important for marketing and revenue tracking. If the user decides to register for a regular login on the website portal, the metatagged data may be used to pre-populate user account registration forms, however, this data may be overridden by the user and stored in the website database. If the user clicks a link on the website portal that redirects them to a third party site, such as an advertiser's web site the metatagged data may be transferred to the advertiser to track any use or ultimate purchases at the advertiser's site. This may assist the website portal in determining where the revenue sharing goes for email click revenue, site click revenue and purchase revenue. A user may also enter the website site from a community management company's web site. Login data from the community management web site may be shared with the website portal, to provide a user with a single sign-on experience. This data received from the community management site may be tracked as indicated above. All navigation on the website portal will be tracked and third party vendors, such as EXACTTARGET or other third party integrators, may be used to track and monitor a user's navigation and links clicked on the website portal. Coupons may be provided to a user on the website portal or embedded in third party links or links to the website portal. The system may use the metatagged information may to track these coupons so that appropriate discounts may be applied to the users' purchases.

The advertiser database 713 may be updated with all sales data 715. If no, the transaction may be terminated and the advertiser database 713 may be updated 719. The database 713 may be updated for all transactions 717.

Figure 8:
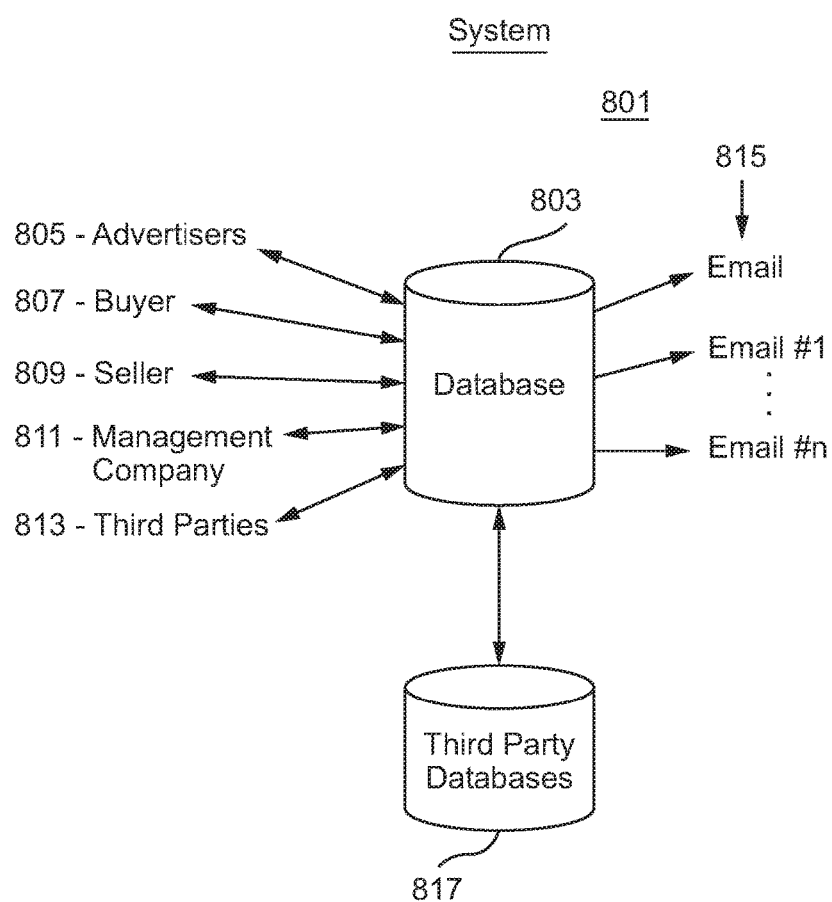
FIG. 8 shows an exemplary system, according to one embodiment.

FIG. 8 shows an exemplary system 801. A database 803 may interact with several parties, such as advertisers 805, buyers 807, homeowners/sellers 809, management companies 811 and/or third parties 813. The system 801 may store and/or send emails 815. The system 801 may also interact with one or more third party databases and/or servers 817.

Figure 9:
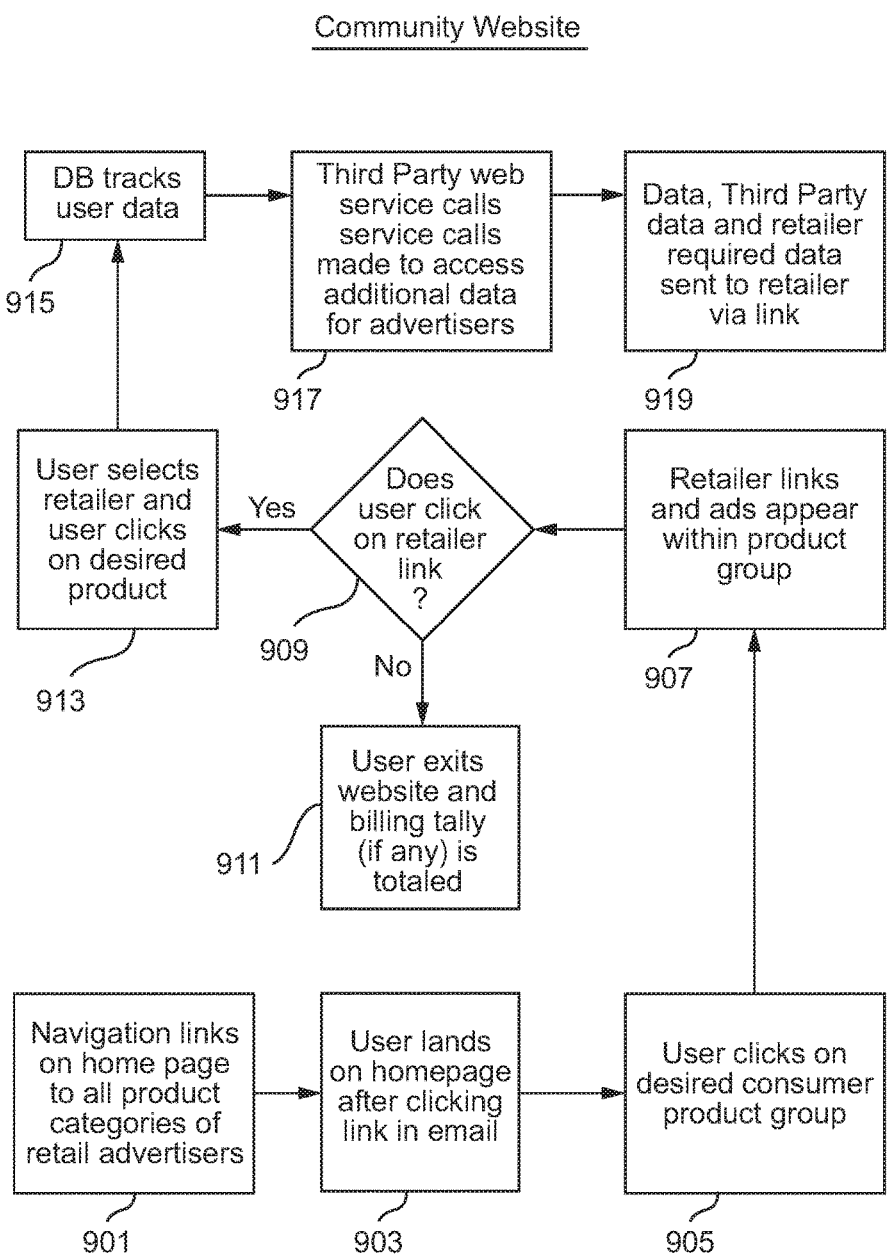
FIG. 9 shows an exemplary process for a community website or portal.

FIG. 9 shows an exemplary process for a community website or portal. Navigation links on a homepage or other page may direct users to all product categories of advertisers 901. Examples of product categories may include, but is not limited to, movers, contractors, appliance dealers, landscapers, etc. The user may land on the homepage, for example, after clicking a link in an email from the system 903. The user may click on a desired consumer product or service group 905. The advertiser links and advertisements may appear within the product or service group 907. A determination may be made as to whether a user clicked on a retailer link 909. If no, the user may exit the website and a billing tally, if any, is tracked 911. If yes, the user may select a retailer and the user may click on desired products or services 913. The database may track user data 915. Third party web service calls may be made to access additional data for advertisers 917. Data, third party data and retailer required data may be sent to the advertiser via a link or other communication 919.

Figure 10:
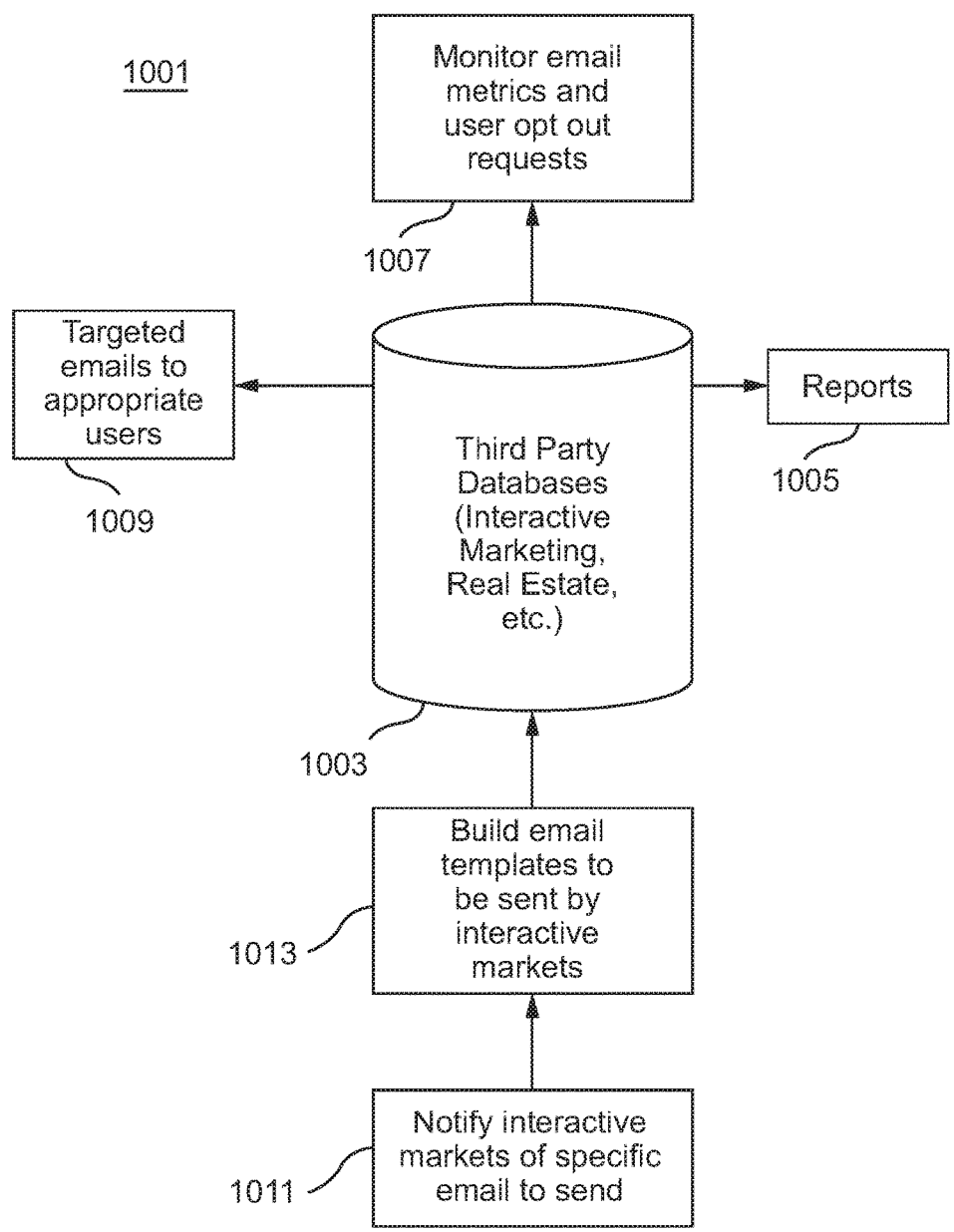
FIG. 10 shows an exemplary third party integration system.

FIG. 10 shows an exemplary third party integration system 1001. One or more third party databases 1003 may be integrated into the system through one or more APIs. Third party databases may include interactive marketers, real estate information aggregators, etc. The third party databases 1003 may perform various functions including, but not limited to, generating reports 1005, monitoring email metrics and user opt out requests 1007, preparing and sending targeted emails to appropriate users 1009, etc. An interactive marketer may be notified of a specific email to send to a user 1011. An email template may be built for sending by the interactive marketer 1013.

The system may use email templates to generate personalized emails for a user or entity related to a real estate transaction using any conventional means known in the art. The email templates may be stored in a system database or third party database, such as an EXACTTARGET database. At a predetermined time and/or after a predetermined event the system will notify a third party system about the email specifications required for a particular email that may be sent to a user. The notification may be sent through an Application Programming Interface (API), a web service or other conventional means known in the art. The notification may contain an XML schema with the metatagged user data discussed above so that each email can be personalized for a specific transaction and/or user. For example, some events that may trigger the notification of the third party system include: order placed by a user for a purchase transaction; order placed by a user for a refinance transaction; when a community manager completes a purchase transaction order; when a community manager completes a refinance transaction order; when a user orders a Lender Questionnaire; when a user requests an update on a product; when a community manager completes an update request; when a user requests a rush order; when a community manager completes a rush order; any anniversary date from a purchase request; a homeowner's request for various items at the manager's or Home Owners Association web site, such as work orders; violation responses; architectural review requests; online assessment payments; party requests for clubhouse reservations; business-to-business transactions, such as remittance emails sent to the management company; document expiration emails; association expiration emails. The system may send emails to users that generate orders as the buyer's or seller's agent and can also receive advertisements within the template email from the third party database and can be redirected to a specific business-to-business link accessible from within the website portal. Email templates may be stored in a third party database. The system may use third party data information to specify what advertising to include in a notification email. The system may recognize certain items like unit type (PUD vs. Condo), geography, time of year, etc. Third party databases information, such as pool availability, lot acreage, number of bedrooms, number of bathrooms, roofing or siding types, etc. may also be used to target specific advertisers. Third party systems may provide delivery and metrics monitoring system for this process. No algorithm is used, but rather the data contained within the API may select the third party template to be used. Data used may include information about products that offer higher revenue to our model a more favorable position in the email and/or on the website portal. Additionally, buyers and sellers may receive emails with multiple advertisements and/or from multiple advertisers within the same business line, such as multiple insurance carriers in certain transactions.

Database integration with third party databases may be provided via one or more APIs. This may allow for automated acquisition of property-specific and/or customer-specific data. Third parties may include accounting software companies, website providers, real estate data providers, interactive marketers, consumer product and service companies, real estate data providers, vendors, etc.

The system may then gather additional information about the property in question from third parties, such as ZILLOW, REDS, etc., to supplement information collected during the ordering process. Real estate information may include, but is not limited to, age of subject property, number of bedrooms, number of bathrooms, construction type, roofing material, pool information, fireplace information, etc. This information may not be specified in the real estate transaction. For example, upon entering or populating a location field for a property, the system may pull data regarding the specific unit and owner from various locations, including, but not limited to, the management company's accounting software, third party real estate databases, etc. An interactive marketer may receive email specifications and/or templates from the system to send to users based on the information from the system databases and third party databases.

The email or other communications described herein may be generated by the system. One or more templates may exist for communications. Each communication may be related to a particular threshold or event, such as a date, income level, location, etc. For example, at a set time before a predetermined event, such as the estimated closing date, users, such as the buyer and seller, may be sent emails with offers from advertisers identified by the system. Events may be tracked through time. For example, communications may be sent around anniversaries of events with relevant offers for that anniversary. Advertisers may be identified through any system. In certain embodiments, advertisers may submit ideal criteria of buyers or sellers. The information collected about the buyers or sellers may be compared to thresholds of the criteria submitted by the advertisers. The best match between advertisers and properties, buyers or sellers may be provided. Alternatively, any advertiser's materials matching the buyer or seller may be provided. Criteria may include geographic location, property information, customer information, advertising fees, etc.

The email may include special offers, coupons, discounts, etc.

Email or other communications preferably come from a source known to the buyer or seller, such as a management company. The initial communications may include an introduction from the management company and an explanation of the system. The introduction may be via a video presentation. Use of a known source may improve user acceptance. Furthermore, this may improve branding of the management company.

Preferably, all email activity and user clicks may be recorded and tracked by the system and stored in a database. Data from the system or third parties may be metatagged within a link sent to the user. The metatagged link may be transmitted to the advertiser, such that they are able to use the metatagged information to communicate with the user, determine offers for the user, etc. This metatagged information may enable the advertiser to contact the user directly, and may enable services, such as instant quotes for enhanced customer service. In certain embodiments, the system can also provide buyers and sellers with the option to request competing quotes for goods or services from multiple vendors/advertisers registered with the system. Furthermore, the metatagged information may allow the system to track the user as they navigate the website. Data can be transmitted to a cell phone to use as a coupon with the advertiser or for immediate purchase online. Data can then be transmitted back to the system to track and record purchases for revenue tracking and use as metrics for advertisers.

In some alternatives, a Business-to-Business relationship may be established, in which local advertisers with businesses, such as courier services, waste management, insurance and other services, may be able to use data from the metatagged information to compete with other national businesses. In some alternatives, vendors that want to do business with a management company can advertise on emails generated by the system. For instance, some management company owners may review a system email that provides the semi-monthly remittance report. The ability to advertise on this email would insure that a company owner would see the vendor's advertisement.

In some alternatives, the systems and methods may be implemented using a mobile device, such as an iPhone and Android Smart Phone App to work in conjunction with the YCC portal. The systems and methods implemented on the mobile device may provide functionality such as specials notifications, electronic coupons, GPS recognition when close to advertiser's retail locations, ordering processes, and other functionality related to the advertisement.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A system for targeted advertising in real estate, the system comprising:
   a server computer;
   one or more databases in communication with the server computer;
   the server computer executing a method comprising:
   receiving information about a selected property for a real estate transaction from a user;
   receiving biographical information about the user;
   creating an account based on the biographical information received about the user and the information received about the selected property;
   transmitting data from the account to one or more third party databases, wherein the one or more third party databases process the transmitted data;
   receiving a response from the one or more third party databases, wherein the response contains additional information about the selected property;
   updating the account with the additional information about the selected property;
   extracting a plurality of criteria about the selected property from the updated account, wherein the plurality of criteria comprises at least one of property age, property square footage, lot size, availability of a pool on the property, number of bedrooms, number of bathrooms, property landscaping, pictures, roofing or siding types, roofing material, Homeowner's Association (HOA) Information or fireplace information;
   identifying a geographic location of the selected property;
   identifying a current time of year;
   selecting a property value for the selected property from the additional information, wherein the selection comprises a sales history, a valuation estimate, a rental estimate, or a tax history;
   selecting one or more advertisements for display to the user, the selection being dependent on one or more features from the extracted plurality of criteria, the identified geographic location, the identified current time of year, and the selected property value;
   creating a communication template from the one or more selected advertisements;
   sending the communication template at an interval, wherein the communication template has one or more embedded links, and at least one of the embedded links leads to a website portal; and
   obtaining tracking information of the user by tracking, by at least one of the one or more databases, subsequent transactions by the user, portions of the website portal accessed by the user, and links on the website portal that the user has clicked on,
   wherein the selection of one or more additional advertisements is further based on the tracking information of the user,
   wherein tracking information of the user is compared to thresholds of criteria submitted by advertisers.

2. The system of claim 1, wherein the additional information is information related to a real property.

3. The system of claim 1, wherein the additional information is information from a real estate database.

4. The system of claim 1, wherein the communication template is sent to the user and another party to the transaction.

5. The system of claim 1, wherein the communication template is sent to an interactive marketer.

6. The system of claim 1, wherein the website portal is selected from a group consisting of: a community website for a management company or an HOA, a goods and services website, a third party website, or combinations thereof.

7. The system of claim 1, wherein the communication template includes a multimedia presentation by one or more parties to the transaction other than the user.

8. The system of claim 1, further comprising tracking the user's actions with metatagged information.

9. The system of claim 8, further comprising storing the tracked information.

10. The system of claim 8, further comprising providing information regarding user purchases or sales to an advertiser.

11. The system of claim 1, further comprising providing purchaser contact information to the advertisers.

12. The system of claim 1, further comprising tracking the subsequent transactions to completion.

13. The system of claim 1, wherein one or more of the embedded links is to a community website for a management company.

14. A computer-implemented method for targeted advertising during a real estate transaction performed by at least one computer system based on instructions on at least one computer medium, the method comprising:
   receiving information about a selected property for a real estate transaction from a user;
   receiving biographical information about the user;
   creating an account based on the information received about the selected property and biographical information received about the user;
   transmitting data from the account to one or more third party databases, wherein the one or more third party databases process the transmitted data;
   receiving a response from the one or more third party databases, wherein the response contains additional information about the selected property;
   updating the account with the additional information about the selected property;
   extracting a plurality of criteria about the selected property from the updated account, wherein the plurality of criteria comprises at least one of property age, property square footage, lot size, availability of a pool on the property, number of bedrooms, number of bathrooms, property landscaping, pictures, roofing or siding types, roofing material, Homeowner's Association (HOA) Information or fireplace information;
   identifying a geographic location of the selected property;
   identifying a current time of year;
   selecting a property value for the selected property from the additional information, wherein the selection comprises a sales history, a valuation estimate, a rental estimate, or a tax history;
   selecting one or more advertisements for display to the user, the selection being dependent on one or more features from the extracted plurality of criteria, the identified geographic location, the identified current time of year, and the selected property value;
   generating a communication template from the selected at least one advertisement;

sending the communication template at an interval, wherein the communication template has one or more embedded links to a website portal, and at least one of the embedded links leads to a website portal; and obtaining tracking information of the user by tracking, by at least one of the one or more databases, subsequent transactions by the user, portions of the website portal accessed by the user, and links on the website portal that the user has clicked on, wherein the selection of one or more additional advertisements is further based on the tracking information of the user, wherein tracking information of the user is compared to thresholds of criteria submitted by advertisers.

15. The computer-implemented method of claim 14, wherein the communication template is sent to the user and another party of the transaction.

16. The computer-implemented method of claim 14, wherein the communication template is sent to an interactive marketer.

17. The computer-implemented method of claim 14, further comprising tracking the user's actions with metatagged information, storing the tracked information, providing information regarding user purchases or sales to an advertiser, and providing user contact information to the advertisers.

18. The computer-implemented method of claim 14, wherein the real estate transaction is selected from a group consisting of: renting a property, selling a property, refinancing a property, inquiries about documents for a property, engaging real estate agents for a property, listing properties with listing services, showing properties, identifying buyers for properties, signing contracts for properties, opening escrow, ordering disclosure package for parties to a real estate transaction and combinations thereof.

19. The computer-implemented method of claim 14, wherein the user is selected from a group consisting of: title or escrow agents, lenders, realtors, attorneys, buyers, sellers, renters, movers, contractors, appliance dealers, landscapers, insurers, home owners, retailers, other real estate service providers, and combination thereof.

20. The computer implemented method of claim 14, wherein at least one of the third party databases is a real estate database.

21. The system of claim 1, wherein the HOA information comprises at least one or a combination of the following: HOA governing documents, state compliance forms, management company information, address of the selected property, name of a closing agent, name of a realtor, company and contact information, a seller name, the selected property and contact information of an owner of the selected property, a buyer's name, current residence and contact information of the buyer, closing date, and a homeowner's request at a manager's or HOA website including work orders.

22. The computer-implemented method of claim 14, wherein the HOA information comprises at least one or a combination of the following: HOA governing documents, state compliance forms, management company information, address of the selected property, name of a closing agent, name of a realtor, company and contact information, a seller name, the selected property and contact information of an owner of the selected property, a buyer's name, current residence and contact information of the buyer, closing date, and a homeowner's request at a manager's or HOA website including work orders.

* * * * *